(12) United States Patent
Nakagawa et al.

(10) Patent No.: US 7,192,317 B2
(45) Date of Patent: Mar. 20, 2007

(54) DETECTING DEVICE AND METHOD OF PRODUCING THE SAME

(75) Inventors: Shunichi Nakagawa, Miyagi-ken (JP); Satoshi Asayama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/412,411

(22) Filed: Apr. 26, 2006

(65) Prior Publication Data

US 2006/0264101 A1 Nov. 23, 2006

(30) Foreign Application Priority Data

May 23, 2005 (JP) ............................. 2005-149841

(51) Int. Cl.
*H01R 13/405* (2006.01)
(52) U.S. Cl. ..................................... 439/736
(58) Field of Classification Search ................ 439/736, 439/651
See application file for complete search history.

(56) References Cited

U.S. PATENT DOCUMENTS

| | | | | |
|---|---|---|---|---|
| 5,224,879 | A * | 7/1993 | Mullins et al. ............. | 439/651 |
| 6,219,913 | B1 * | 4/2001 | Uchiyama ................... | 29/883 |
| 6,256,881 | B1 * | 7/2001 | Starkey ....................... | 29/858 |
| 6,269,539 | B1 * | 8/2001 | Takahashi et al. ............ | 29/883 |
| 6,361,376 | B1 * | 3/2002 | Onoda ........................ | 439/736 |
| 6,637,260 | B2 | 10/2003 | Hosogoe | |
| 6,756,711 | B2 * | 6/2004 | Matsuyama et al. ...... | 310/68 R |
| 6,958,674 | B2 * | 10/2005 | Tsuchida .................... | 338/276 |
| 7,109,617 | B2 * | 9/2006 | Mizutani et al. .............. | 310/71 |

FOREIGN PATENT DOCUMENTS

JP    2000-150038    5/2000

* cited by examiner

*Primary Examiner*—Tulsidas C. Patel
*Assistant Examiner*—Harshad C Patel
(74) *Attorney, Agent, or Firm*—Beyer Weaver LLP

(57) ABSTRACT

A detecting device includes a housing, a detecting unit mounted to the housing, and a terminal insert-molded to the housing. One end of the terminal is electrically connected with the detecting unit, and the other end of the terminal has a rising portion and is led out of the housing. The housing has a gate side and a columnar terminal lead-out portion. The gate side is disposed in correspondence with a gate into which a resinous material is injected during injection molding. The terminal lead-out portion covers a base of the rising portion of the terminal. The terminal has a protrusion at the base of the rising portion. The protrusion protrudes up to a surface of the terminal lead-out portion in a direction that is substantially parallel to a direction perpendicular to the gate side.

3 Claims, 3 Drawing Sheets

DETECTING DEVICE AND METHOD OF PRODUCING THE SAME

BACKGROUND OF THE INVENTION

1. Field of the Invention

The present invention relates to a detecting device including a housing to which a detecting unit is mounted. More particularly, the present invention relates to a detecting device formed by insert molding a terminal (for an outputting operation to the outside) to a housing, and to a method for producing the detecting device.

2. Description of the Related Art

Hitherto, a detecting device which detects a rotation angle of a rotary valve, such as a throttle valve, has detected the rotation angle of the throttle valve by rotating a rotary member together with a shaft of the throttle valve and by bringing the rotary member into contact with a resistance substrate secured to a housing. The rotary member has a slider mounted thereto and is secured to an end of the shaft of the throttle valve.

A terminal is connected to the resistance substrate by, for example, soldering for performing an outputting operation to the outside. The terminal, which is electrically connected with the resistance substrate, is integrally formed with the housing by insert molding. More specifically, the terminal is integrally formed by disposing the terminal in a mold, used for forming the housing, and filling the mold with molten resin. An example of such a detecting device is that described in Japanese Unexamined Patent Application Publication No. 2002-039789.

However, such a related detecting device has the following problems. The terminal which is electrically connected with the resistance substrate has a rising portion which is led out of the housing and is connected to an external device. When a direction in which the rising portion is led out differs from a direction in which the resin with which the mold is filled flows, the rising portion is pushed by the flow of the resin when the mold is filled with the resin, causing displacement or deformation of the rising portion. Therefore, it may not be possible to connect the rising portion to an external device because the rising portion is not in correspondence with a connection form of the external device.

SUMMARY OF THE INVENTION

Accordingly, it is an object of the present invention to provide a detecting device which makes it possible to prevent displacement or deformation of a portion of a terminal that is connected with an external device even if insert-molding is carried out. It is also an object of the present invention to provide a method of producing the detecting device.

To these ends, according to a first aspect of the present invention, there is provided a detecting device comprising a housing, a detecting unit mounted to the housing, and a terminal insert-molded to the housing. One end of the terminal is electrically connected with the detecting unit, and the other end of the terminal has a rising portion and is led out of the housing. The housing has a gate side and a columnar terminal lead-out portion. The gate side is disposed in correspondence with a gate into which a resinous material is injected during injection molding. The terminal lead-out portion covers a base of the rising portion of the terminal. The terminal has at least one protrusion at the base of the rising portion. The at least one protrusion protrudes up to at least one surface of the terminal lead-out portion in at least one direction that is substantially parallel to a direction perpendicular to the gate side.

In one form, the at least one protrusion protrudes in two directions included in the at least one direction that is substantially parallel to the direction perpendicular to the gate side.

In another form, an end of the at least one protrusion is substantially semicircular.

According to a second aspect of the present invention, there is provided a method of producing a detecting device which has a housing integrally formed with a terminal by using a mold. The housing has a detecting unit mounted thereto. One end of the terminal is electrically connected with the detecting unit, and the other end of the terminal has a rising portion. The method comprises the steps of forming a housing formation portion in the mold, forming a lead-out portion formation portion and a gate at the housing formation portion, forming a protrusion on a base of the rising portion of the terminal, and injecting resinous material from the gate. The housing formation portion is in correspondence with an external shape of the housing. The lead-out portion formation portion is in correspondence with a columnar terminal lead-out portion which covers the base of the rising portion of the terminal. The gate is where the resinous material is injected. The protrusion protrudes to a wall of the lead-out portion formation portion in a direction substantially parallel to a direction of flow of the resinous material that is injected from the gate. In the step of injecting the resinous material from the gate, the resinous material is injected from the gate while an end of the protrusion of the rising portion is in contact with the lead-out portion formation portion and the terminal is disposed in the mold where the housing formation portion is formed.

According to the detecting device of the present invention, the terminal has at least one protrusion at the base of the rising portion. The at least one protrusion protrudes up to at least one surface of the terminal lead-out portion in at least one direction that is substantially parallel to a direction perpendicular to the gate side. Accordingly, molding is performed by filling a mold (used for forming the terminal lead-out portion) with resinous material while the end of the protrusion is in contact with an inner surface of the mold. Therefore, even if the base of the rising portion receives a resin flow force during the molding, the protrusion which contacts the mold can prevent deformation of an end of the rising portion that is a connection portion which is connected to an external device.

In addition, according to the detecting device of the present invention, the at least one protrusion protrudes in two directions included in the at least one direction that is substantially parallel to the direction perpendicular to the gate side. Therefore, it is possible to prevent deformation of the end of the rising portion in a direction of resin flow and in a direction opposite thereto.

Further, according to the detecting device of the present invention, an end of the at least one protrusion is substantially semicircular. Therefore, it is possible to minimize exposure at a surface of the terminal lead-out portion, so that air-tightness of the housing can be maintained.

According to the method of producing a detecting device of the present invention, the terminal is insert-molded to the housing by filling the mold with resinous material from the gate while the end of the protrusion of the rising portion is in contact with the lead-out portion formation portion, and the protrusion is disposed in a direction that is substantially parallel to the direction of resin flow. Therefore, even if the base of the rising portion receives a resin flow force, the force can be restricted at the protrusion, so that an end of the rising portion is led out without being displaced or deformed. As a result, the terminal can be integrally formed with high precision.

DESCRIPTION OF THE PREFERRED EMBODIMENT

Figure 1:
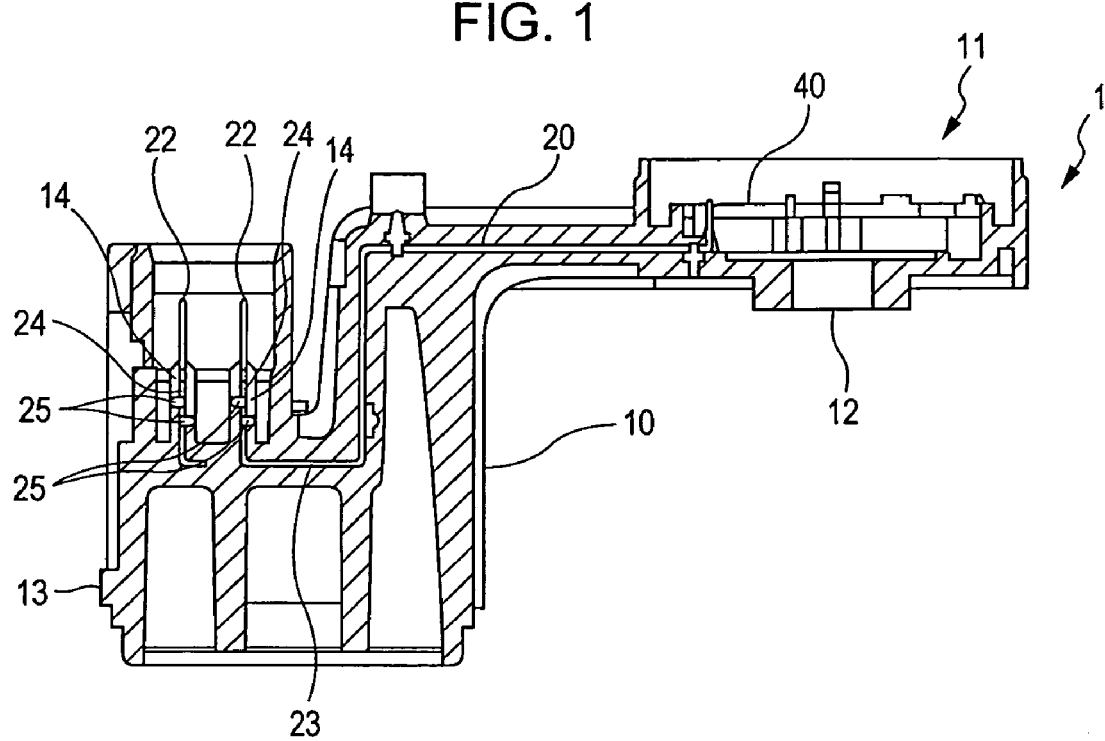
FIG. 1 is a sectional view of a detecting device according to an embodiment of the present invention.

A detailed description of an embodiment of the present invention will be given with reference to the drawings. FIG. 1 is a sectional view of a detecting device 1 according to the embodiment. As shown in FIG. 1, the detecting device 1 according to the embodiment includes a housing 10 and a terminal 20 integrally formed with the housing 10 by insert molding. A detecting unit which detects a rotation angle of, for example, a rotary valve is mounted to the housing 10. The terminal 20 is electrically connected with the detecting unit and outputs a detected rotation angle signal to an external device.

The housing 10 has a substantially cylindrical accommodation portion 11 as shown in FIG. 1. A resistance substrate 40, which is a portion of the detecting unit, is secured to the accommodation portion 11. A detection object (not shown), such as a rotary valve, is inserted into a lower portion of the accommodation portion 11. A rotary member having a slider (which is a portion of the detecting unit) mounted thereto is secured to an end of a shaft of the rotary valve, and rotates together with the shaft. A resistance pattern is formed on a surface of the resistance substrate 40, and the slider resiliently contacts the resistance pattern. The slider slides on the resistance substrate 40 by rotation of the rotary member, so that the rotation angle of the rotary valve is detected by a change in a resistance value resulting from a change in a position where the slider and the resistance pattern contact each other. A cover for covering the accommodation portion 11 is mounted to a top portion of the accommodation portion 11 by, for example, using an adhesive to hermetically seal the inside of the accommodation portion 11.

The housing 10 is formed by injection molding, and has a gate side 13 formed at a left end thereof in FIG. 1 in correspondence with a gate into which resinous material is injected. The terminal 20 is integrally formed with the housing 10 by insert molding. The housing 10 also has near its left end in FIG. 1 a columnar terminal lead-out portion 14 which leads out the terminal 20 to the outside. The terminal lead-out portion 14 is formed so as to extend substantially orthogonal to a direction perpendicular to the gate side 13.

Figure 2:
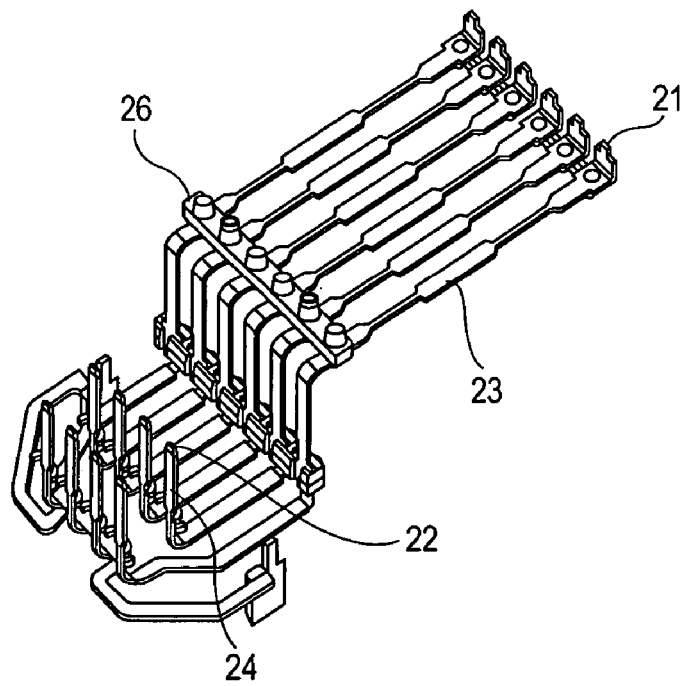
FIG. 2 is a perspective view of a terminal.

One end of the terminal 20 integrally molded to the housing 10 is connected in correspondence with the pattern on the resistance substrate 40 by, for example, soldering, and the other end of the terminal 20 is lead out from an end of the terminal lead-out portion 14. It is possible for the terminal 20 that is lead out from the terminal lead-out portion 14 to be connected to the external device for outputting an output from the resistance substrate 40. FIG. 2 is a perspective view of the terminal 20.

As shown in FIG. 2, the terminal 20 has a plurality of thin electrically conductive plates that are used for outputting a rotational angle signal detected by the resistance substrate 40 and for signal input and grounding. They are secured so as to maintain a predetermined distance therebetween by linking portions 26.

As shown in FIGS. 1 and 2, in the terminal 20, substrate connection portions 21, which are connected to the resistance substrate 40, and rising portions 24, whose bases are covered by the terminal lead-out portion 14 of the housing 10, are connected to each other by respective linking portions 23. An end of each rising portion 24 is a connection portion 22 which is led out from the terminal lead-out portion 14 and connected to the external device. Each rising portion 24 is provided with protrusions 25 at its base that is covered by the terminal lead-out portion 14.

Figure 3A:
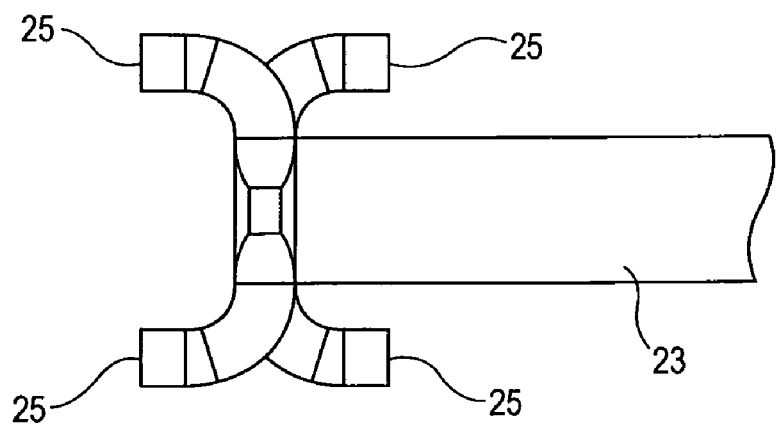
FIGS. 3A and 3B are enlarged views of a rising portion and the vicinity thereof.
Figure 3B:
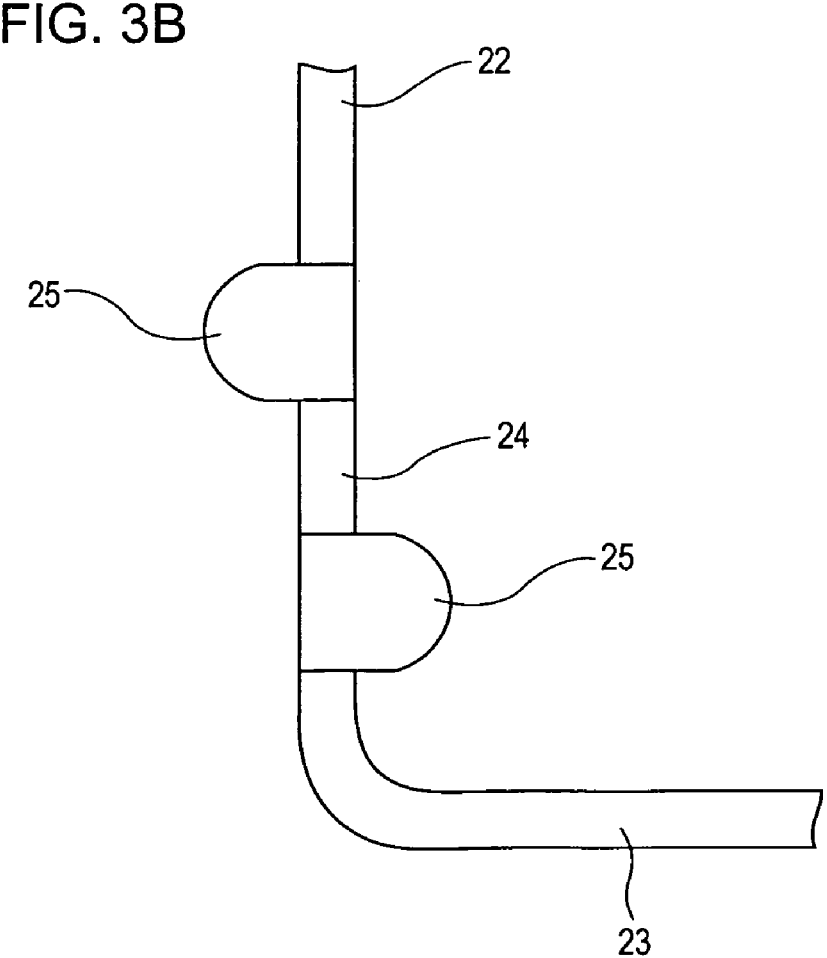

FIGS. 3A and 3B are enlarged views of a rising portion 24 and the vicinity thereof. More specifically, FIG. 3A is an enlarged plan view, and FIG. 3B is an enlarged side view. As shown in FIGS. 1 and 3, the protrusions 25 protrude from respective side surfaces of each rising portion 24 to surfaces of the terminal lead-out portion 14 in directions substantially parallel to the direction perpendicular to the gate side 13 of the housing 10. An end of each protrusion 25 has a substantially semicircular shape. In the embodiment, the protrusions 25 of each rising portion 24 extend in two respective directions that are substantially parallel to the vertical direction with respect to the gate side 13.

Figure 4:
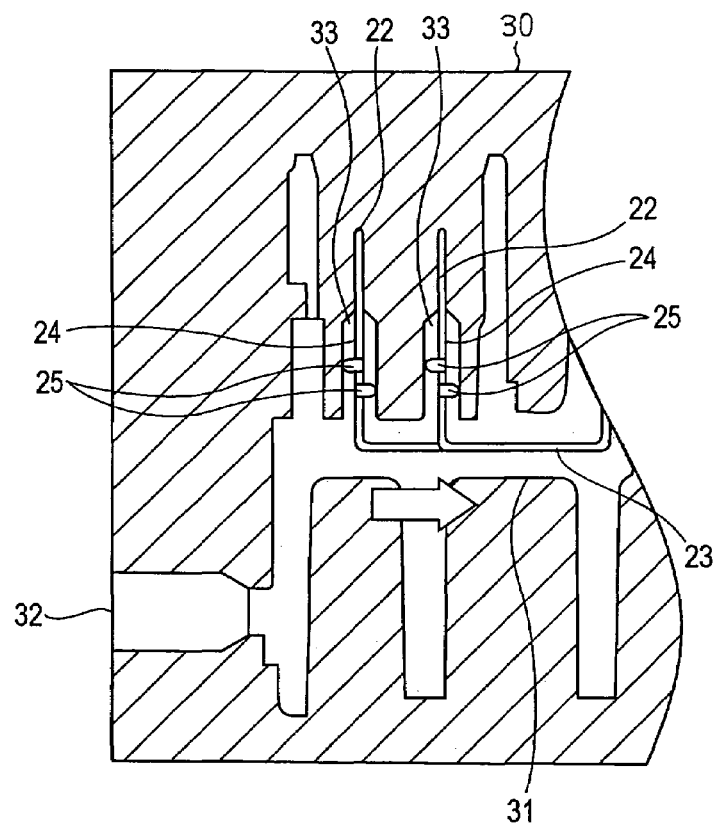
FIG. 4 is a vertical sectional view of a mold for forming the detecting device according to the present invention.

In the detecting device 1 according to the embodiment, the terminal 20 is integrally formed with the housing 10 by filling a mold (used for molding a housing) with resinous material and cooling and solidifying the resinous material while the terminal 20 is disposed in the mold. FIG. 4 is a vertical sectional view of a mold 30 for forming the detecting device 1 according to the embodiment. More specifically, FIG. 4 shows the gate 32 where the resinous material is injected and the vicinity of the gate 32. As shown in FIG. 4, in the mold 30, a housing formation portion 31 is formed in correspondence with an external shape of the housing 10. While the terminal 20 that has been previously formed is disposed in a space defined by the housing formation portion 31, resin is injected from the gate 32, so that the detecting device 1 is formed by injection molding.

The gate 32, which is a resin injection portion, is disposed at a left end (in FIG. 4) of the housing formation portion 31, and the housing formation portion 31 is filled with the resinous material from the gate 32. A lead-out portion formation portion 33 corresponding to the terminal lead-out portion 14 which leads the terminal 20 to the outside is formed near the left end of the housing formation portion 31.

As mentioned above, since the gate 32 is formed at the left end of the space of the housing formation portion 31, a direction of flow of the resin in the space is as indicated by an arrow shown in FIG. 4. Since the rising portions 24 of the terminal 20 are disposed at the cylindrical lead-out portion formation portion 33, they are disposed in a direction other than in the direction of flow of the resin. In other words, lower ends of the rising portions 24 receive a resin flow force.

Since the protrusions 25 of each rising portion 24 protrude to walls of the lead-out portion formation portion 33, so as to extend in the two respective directions substantially parallel to the vertical direction with respect to the gate 32 of the housing formation portion 31, it is possible to dispose the rising portions 24 while the protrusions 25 are in contact with the lead-out portion formation portion 33. Therefore, even if the lower ends of the rising portions 24 receive a force by the resin that is injected from the gate 32, since the ends of the protrusions 25 are in contact with the lead-out portion formation portion 33, the rising portions 24 can resist the flow of the resin. Consequently, for example, the connection portions 22 which are connected to an external device and which are disposed above the protrusions 25 are prevented from being displaced in the direction of the resin flow and in the opposite direction, so that it is possible to increase product precision and to manufacture with high yield.

Since the end of each protrusion 25 is substantially semicircular, it is possible to minimize exposure of each protrusion 25 at the terminal lead-out portion 14 after molding, so that air-tightness of the housing 10 can be maintained. The shape of the end of each protrusion 25 is not limited to that of the embodiment as long as the shape can minimize exposure at the surface of the terminal lead-out portion 14. For example, the shape may be triangular.

Since the protrusions 25 are also formed in the direction opposite to the direction of the resin flow, when the terminal 20 is disposed in the mold 30, it can be fitted to the lead-out portion formation portion 33 corresponding to the terminal lead-out portion 14. Therefore, the rising portions 24 can be easily aligned. In addition, since a pair of the protrusions 25 are formed on both surfaces of each rising portion 24, the rising portions 24 can be disposed parallel to the walls of the lead-out portion formation portion 33. When the rising portions 24 are to be more firmly secured, more protrusions 25 may be used.

Although the present invention is described with reference to a preferred embodiment, it is to be understood that the present invention is not limited to the preferred embodiment, so that it may be variously practiced within the scope of the technical ideas of the present invention.

What is claimed is:

1. A detecting device comprising:
   a housing;
   a detecting unit mounted to the housing; and
   a terminal insert-molded to the housing, one end of the terminal being electrically connected with the detecting unit, the other end of the terminal having a rising portion and being led out of the housing,
   wherein the housing has a gate side and a columnar terminal lead-out portion, the gate side being disposed in correspondence with a gate into which a resinous material is injected during injection molding, the terminal lead-out portion covering a base of the rising portion of the terminal, and
   wherein the terminal has at least one protrusion at the base of the rising portion, said at least one protrusion protruding up to at least one surface of the terminal lead-out portion in at least one direction that is substantially parallel to a direction perpendicular to the gate side.

2. The detecting device according to claim 1, wherein said at least one protrusion protrudes in two directions included in said at least one direction that is substantially parallel to the direction perpendicular to the gate side.

3. The detecting device according to claim 1, wherein an end of said at least one protrusion is substantially semicircular.

* * * * *